(12) United States Patent
Williams et al.

(10) Patent No.: US 12,542,741 B2
(45) Date of Patent: Feb. 3, 2026

(54) NETWORK ROUTE LOOKUP OPERATIONS

(71) Applicant: MICROSOFT TECHNOLOGY LICENSING, LLC, Redmond, WA (US)

(72) Inventors: Matthew Ian Ronald Williams, London (GB); Alan David Elder, Welwyn Garden City (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 18/139,350

(22) Filed: Apr. 25, 2023

(65) Prior Publication Data

US 2024/0364629 A1  Oct. 31, 2024

(51) Int. Cl.
*H04L 45/745* (2022.01)
*H04L 45/748* (2022.01)

(52) U.S. Cl.
CPC .......... *H04L 45/748* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 7,787,466 B1 * | 8/2010 | Leelanivas | H04L 45/04 370/392 |
| 9,847,935 B2 * | 12/2017 | Gobriel | H04L 45/7453 |
| 10,135,734 B1 * | 11/2018 | Singh | H04L 45/7453 |
| 10,623,311 B2 * | 4/2020 | Gobriel | H04L 45/7453 |
| 10,659,363 B2 * | 5/2020 | Lim | H04L 45/60 |
| 10,673,757 B2 * | 6/2020 | Parthasarathy | H04L 63/20 |
| 2017/0237662 A1 * | 8/2017 | Labonte | H04L 47/17 370/392 |
| 2019/0149472 A1 * | 5/2019 | Singh | H04L 45/7453 370/392 |
| 2019/0173791 A1 | 6/2019 | Lim | |

(Continued)

OTHER PUBLICATIONS

International Search Report and Written Opinion received for PCT Application No. PCT/US2024/023508 , Jul. 25, 2024, 16 pages.

(Continued)

*Primary Examiner* — Alpus Hsu
(74) *Attorney, Agent, or Firm* — Han Gim; Newport IP, LLC

(57) ABSTRACT

The techniques disclosed herein enable systems to enhance the efficiency of computer networking devices through a streamlined routing lookup structure for storing network routes and processing network packets. The routing lookup structure can comprise a lookup table, a set of range tables, and a default range table. The lookup table can process a portion of a network packet address with additional processing at a range table if the portion matches an entry at the lookup table. If there are no matches at the lookup table, the packet is processed by the default range table. The routing lookup structure can further include a secondary lookup table and dynamic optimization for reconfiguring the routing lookup structure to adapt to network conditions. In addition, the routing lookup structure can store new routes based on the length of the prefix. Routes that fall below a minimum length are stored in the default range table.

20 Claims, 9 Drawing Sheets

(56) References Cited

U.S. PATENT DOCUMENTS

| | | |
|---|---|---|
| 2020/0213230 A1 | 7/2020 | Labonte |
| 2021/0006495 A1* | 1/2021 | Yeh ......................... H04L 45/44 |
| 2021/0119926 A1* | 4/2021 | Olakangil ............... H04L 45/64 |
| 2024/0259312 A1* | 8/2024 | Iyer ....................... H04L 45/748 |

OTHER PUBLICATIONS

International Preliminary Report on Patentability received for PCT Application No. PCT/US2024/023508, mailed on Nov. 6, 2025, 11 pages.

* cited by examiner

NETWORK ROUTE LOOKUP OPERATIONS

BACKGROUND

As more data and services are stored and provided online via network connections, providing high performance and an optimal and reliable user experience is an important consideration for network providers and computer networking device manufacturers. In various examples, computer networking devices can include electronic devices that communicate and interact over a computer network via network packets such as gateways, routers, and switches. Network packets can be a formatted unit of data containing control information and user data. Such computer networking devices can implement software programs that process and execute network operations such as packet routing, rewriting, filtering and so forth.

One function of these network operations is network packet routing. Generally described, network packet routing involves processing network packets at a computer networking device according to a routing table to direct network traffic to a subsequent device in the network (e.g., a next hop) en route to a final network destination. A routing table is a data structure that is stored in a computer networking device such as a router or a network host that lists routes to particular network destinations. That is, the routing table contains information about the topology of the network in the immediate vicinity of the associated computer networking device.

As the number of connected devices and network entities (e.g., mobile devices, personal computers, smart home devices) grows over time so does the number of routes in a routing table. Ultimately, routing tables can expand to such a size that referencing the routing table to direct network traffic can severely impact network performance leading to low speeds, increased congestion, and generally a degraded user experience. As such, many modern computer networking devices employ mechanisms for transforming large routing tables to compact lookup structures. These lookup structures can fit the cache hierarchies of modern hardware (e.g., CPUs) to improve network speeds and ease congestion. However, routing tables can continue to grow unabated thereby exposing potential inefficiencies of existing lookup structures. In addition, the introduction of new protocols such as internet protocol version 6 (IPv6) can result in additional technical challenges. It is with respect to these and other considerations that the disclosure made herein is presented.

SUMMARY

The techniques disclosed herein enhance the operations of network packet route lookups through a streamlined routing lookup structure. As mentioned above, the rapidly growing number of connected devices and the resulting network routes necessitated mechanisms for transforming large routing tables into compact lookup structures. In this way, modern computer networking devices such as routers and network hosts can maintain high network speeds while accommodating a large number of unique devices. However, as routing tables continue to grow, even these compact lookup structures can exceed acceptable sizes leading to degraded quality of service as well as undue levels of complexity for network providers. In another technical challenge, modern computing devices can also generate and receive an ever-increasing volume of data. This results in an increasing demand on lookup structures. That is, modern networking applications often require high efficiency lookup structures to maintain acceptable network speeds and minimize congestion.

For instance, many computer networking devices utilize common standards for identifying and routing network packets such as internet protocol version 4 (IPv4) and/or internet protocol version 6 (IPv6). In accordance with these standards, computer networking devices can utilize fundamental operations such as longest prefix match for selecting an entry from a routing table based on a destination address of a network packet. In an illustrative example, a routing table at a computer networking device can contain two entries notated as:

192.168.20.16/28
192.168.0.0/16

Each entry denotes a network identifier also known as a network prefix (e.g., 192.168.20.16) as well as the length of the prefix (e.g., /28). In addition, the router can receive a network packet with a destination address notated as:

192.168.20.19

When compared against the above entries, the destination address of the network packet can match both entries. That is, both of the networks identified by the entries contain the destination address. To resolve this overlap, the computer networking device selects the first entry (192.168.20.16/28) as the network prefix is longer than the second entry (192.168.0.0/16). Hence, the longest prefix match.

In the context of longest prefix match, there are certain algorithms that aim to implement this behavior in a more efficient manner through the compact lookup structures mentioned above such as direct/range routing (DXR). Specifically, DXR can utilize a lookup table followed by a series of range tables. The lookup table evaluates a portion of the destination address rather than the full destination address. For instance, a lookup table in a D16R configuration can evaluate the first sixteen bits of an IPv4 destination address rather than the full thirty-two bits. Accordingly, the lookup table can contain entries that are sixteen bits in size.

In the event of a match, the lookup table can be used to either route the packet directly or perform further processing at a range table. In a specific example, a network packet can contain a destination address defined as "192.168.20.19" while the lookup table contains a sixteen-bit entry defined as "192.168.0.0/16". Comparing the destination address against the entry accordingly results in a match. In response, the matching entry can point to a range table that stores routes that fall within the lookup table entry (192.168.0.0/16) such as a more specific network identifier entry (192.168.20.16/28) as well as the broader lookup table entry. In the present example, the more specific network identifier entry with the longest prefix match can be determined to be the match to the destination address. The network packet can then be routed using the matching entry of the range table.

In addition, the lookup table can be programmed with new routes. To accommodate a route with a network identifier that is smaller (i.e., less specific) than the lookup table configuration, many existing methods such as DXR may create a corresponding number of entries for the route in the lookup table. For instance, in a D16R configuration in which the lookup table is sixteen bits wide, a network identifier entry of 10.0.0.0/8 would result in $2^8$ or 256 new entries in the lookup table. Similarly, a network identifier entry of 10.0.0.0/6 would result in $2^{10}$ or 1024 new entries.

Intuitively, constant reprogramming of the lookup table with large numbers of new entries can be highly inefficient. Moreover, expanding the lookup table in this way can lead to degradation in performance as the memory footprint of the lookup table grows. In still another technical challenge, entries from a /8 route can overlap with those from a /10 route which can in turn overlap with entries from a /12 route and so forth. Managing these overlapping entries can introduce an unacceptable level of complexity for network providers.

In contrast to existing methods, the techniques described herein alleviate inefficiencies by selectively creating new lookup table entries while also utilizing a default range table, also known as a no-match range table. The default range table can be utilized by the routing lookup structure to store routes that violates or exceeds a minimum network identifier length of the lookup table. Consider again a lookup table that is configured for sixteen-bit entries. In addition to storing entries for sixteen-bit network identifiers, the lookup table can also be configured to store up additional entries for network identifiers that result in a small number of new entries. For instance, a fifteen-bit network identifier can result in at most two additional entries while a thirteen-bit network identifier can result in at most eight new entries.

As such, the lookup table can be configured with a minimum network identifier length such that routes having a network identifier that is less than the minimum network identifier length are automatically appended to the default range table. In this way, rather than creating hundreds or thousands of new lookup table entries for a new route, new entries are only created as needed thereby dramatically reducing the number of entries in a given lookup table. Consequently, the memory footprint of the routing lookup structure is likewise reduced leading to improved efficiency.

The lookup table can subsequently process network packets using the default range table. For instance, a network packet with a destination address that does not match any of the entries of the lookup table can instead be matched to a default entry. The default entry can direct the network packet to the default range table which can route the network packet accordingly. In another example, the destination address of the network packet may match an entry at the lookup table and accordingly undergo additional comparison at a range table. However, the destination address may not match any of the range table entries. In response, the network packet can also be directed to the default range table.

In another example, the routing lookup structure can be further configured with a secondary lookup table in series with a primary lookup table such as the lookup table discussed above. That is, the default range table can be replaced with a secondary lookup table. Such a configuration can be selected to process network packets with a larger address space. For instance, IPv6 destination addresses are 128 bits in length as opposed to the 32-bit addresses of IPv4. As such, the range tables discussed above can once again become too large and lead to performance degradation. For a routing lookup structure utilizing a primary lookup table and a secondary lookup table, the primary lookup table can be configured to evaluate the first 48 bits of the destination address while the secondary lookup table can be configured to evaluate the first 24 bits of the destination address. Stated another way, the cascaded lookup tables operate with decreasing specificity in response to a network packet that does not match existing entries.

In the event the destination address of the network packet does not match entries in both the primary lookup table and the secondary lookup table, the network packet can be accordingly match to a default entry. The default entry, like the examples mentioned above, can direct the network packet to a default range table that routes the network packet to a subsequent computing device. In addition, an entry can be added to the default range table and not the primary lookup table and/or the secondary lookup table. As mentioned, this can reduce the number of entries in the various tables of the routing lookup structure thereby enhancing efficiency.

Furthermore, in some scenarios, the destination address may fail to match any of the range table entries despite matching an entry at the lookup table. In response, the network packet can instead be directed to the secondary lookup table which may contain a matching entry (e.g., the first twenty-four bits match). As such, the network packet can be processed by a secondary range table. However, the secondary range table may fail to find a matching entry for the destination address. Accordingly, the network packet can be determined as a no-match and processed by the default range table to be routed.

In another example of the technical benefit of the present, the configuration of the routing lookup structure can be dynamically optimized in response to network conditions. For example, if the routing lookup structure processes a small number of routes (e.g., ten), all of the routes can be contained in a default range table and network packets can bypass the lookup table and be directly routed by the default range table. As the number of routes increases, the lookup table can be brought online to divide the lookup operations and extract the efficiency benefits discussed above. Should the number of routes continue to grow, the system can activate the secondary lookup table mentioned above to further reduce the impact of a large routing table. In this way, the discussed system can conserve computing resources by minimizing the size of the routing lookup structure to suit current network behaviors and conditions.

In still another example of the technical benefit of the present disclosure, dynamic optimizations can also be applied to the size of the lookup table entries. For instance, a primary lookup table with 48-bit entries may result in range tables that are too large (i.e., contain too many entries) leading to potential negative impacts to performance. In response, the primary lookup table can be modified to support 50-bit entries instead. As a result, the number of entries in the range tables can be reduced leading to increased efficiency. Stated another way, the processing burden can be redistributed among the various components of the routing lookup structure to improve overall efficiency.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
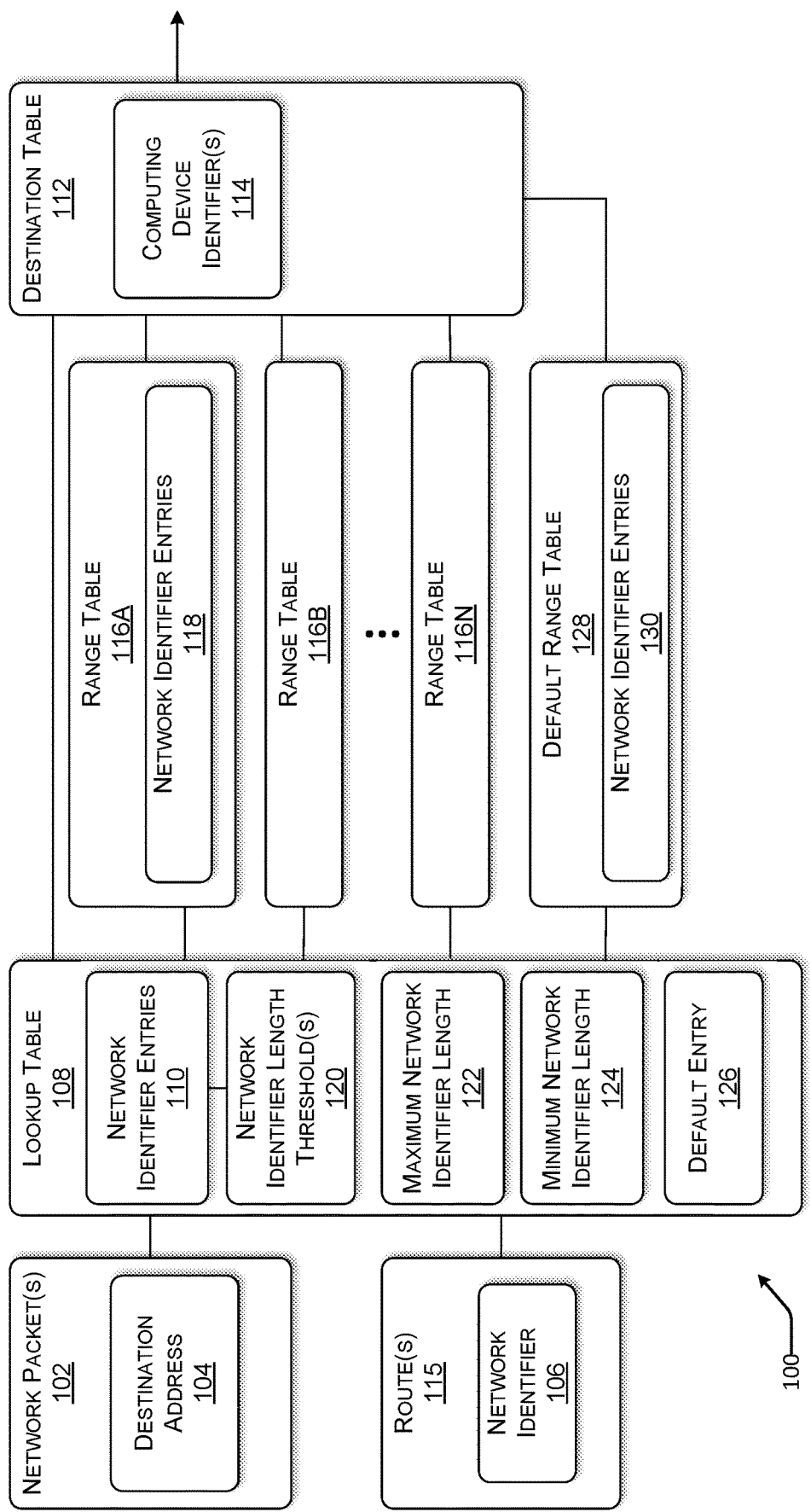
FIG. 1 is a block diagram of a routing lookup structure for routing network packets using a lookup table, range tables, and a default range table.

FIG. 1 illustrates a routing lookup structure 100 that is configured to process network packets 102. In various examples, the network packets 102 can be formatted for compatibility with a standard protocol such as internet protocol version 4 (IPv4) and/or internet protocol version 6 (IPv6). Accordingly, an individual network packet 102 can contain a destination address 104 (e.g., an IPv4 address, an IPv6 address) comprising information to uniquely identify a destination device within the a destination network. In this way, the routing lookup structure 100 can select a route to properly direct the network packet 102 to a destination.

To that end, the routing lookup structure 100 can begin processing the network packet 102 by providing the destination address 104 to a lookup table 108. The lookup table 108 can be configured with a plurality of network identifier entries 110. The network identifier entries can also be referred to as network prefix entries. In a specific example, an individual network identifier entry 110 can be notated as such:

192.168.0.0/16

Where "192.168.0.0" defines the network identifier itself while "/16" defines the length of the network identifier. In the present example, the network identifier entry 110 is sixteen bits in length. That is, the network identifier entry 110, shown above in decimal notation, can be expressed in binary notation as:

0b11000000.10101000

Similarly, the network packet 102 can contain a destination address 104 which can be notated as:

192.168.20.19

The routing lookup structure 100 can accordingly compare a portion of the destination address 104 against the network identifier entries 110 in the lookup table 108 to search for any entries that match some or all of the destination address 104. As mentioned above, the lookup table 108 of the routing lookup structure 100 can be configured with a fixed size for network identifier entries 110 (e.g., sixteen bits). Consequently, the lookup table 108 can also be configured to only examine a first portion of the destination address 104 where the first portion is the same size as the network identifier entries 110. Stated alternatively, the lookup table 108 can be configured with a predetermined value that governs the size of network identifier entries 110 as well as the size of the portion of the destination address 104 that is compared. For example, the first portion of the destination address 104 shown above (192.168.20.19) can be determined to match the network identifier entry 110 shown above (192.168.0.0/16) as the first sixteen bits of the destination address 104 matches the full sixteen bits of the network identifier entry 110.

In one example, the network identifier entry 110 that matches the appropriate number of bits of the destination address 104 of the network packet 102 can be indexed to a corresponding entry at a destination table 112 containing a computing device identifier 114. In response, the network packet 102 can be subsequently routed to the computing device identifier 114. In another example, the network packet 102 can be directly transmitted to a next hop within the computing network en route to the destination defined by the destination address 104. It should be understood that the result of the routing lookup structure 100 can be utilized to transmit the network packet 102 using any suitable method and may not necessarily utilize the destination table 112.

In an alternative example, the network identifier entry 110 that matches the destination address 104 of the network packet 102 can be indexed to a subsequent range table 116A-116N for further processing. That is, within the network identifier entry 110, there may be additional, longer, network identifiers that match the destination address 104 more exactly. For instance, the example network identifier entry 110 shown above can lead to a range table 116A that can contain additional network identifier entries 118. In a specific example, a network identifier entry 118 in the range table 116A can be expressed as:

192.168.20.16/28

Where "192.168.20.16" is the network identifier itself and "/28" indicates that the length of the network identifier entry 118 is 28 bits. As mentioned, the network identifier entry 118 can be a more specific computing network within a broader network such as the network identifier 110 shown above (192.168.0.0/16). Consider again the example destination address 104 shown above (192.168.20.19). From a search of the range table 116A, the routing lookup structure 100 can determine that the destination address 104 matches the network identifier entry 118. In this way, the routing lookup structure 100 can implement the longest prefix match behaviors discussed above. The routing lookup structure 100 can proceed to select an entry from the destination table 112 that corresponds to the matching network identifier entry 118. Accordingly, the network packet 102 can be transmitted to a subsequent computing device.

In still another example, the routing lookup structure 100 may determine that there are no matches in both the lookup table 108 and the range table 116A. In response, the destination address 104 can be processed by a default range table 128. For instance, the destination address 104 can be configured as 192.168.0.1. In addition, the lookup table 108 can include a network identifier entry 110 defined as 192.168.0.0/16 while an associated range table 116A can include two network identifier entries 118 defined as 192.168.1.0/24 and 192.168.20.16/28 respectively. Moreover, the default range table 128 can include a network identifier entry 130 defined as 192.0.0.0/8. As such, the destination address 104 can match the network identifier entry 110. However, upon analysis at a range table 116A, the destination address 104 may not match any of the available network identifier entries 118. In response, the destination address 104 can be matched to the network identifier entry 130 at the default range table and routed accordingly.

In addition the routing lookup structure 100 can be configured with a new route 115 defining a network identifier 106. That is, the network identifier 106 within the route 115 is not among the network identifier entries 110 within the lookup table 108. In response, the routing lookup table 100 can process the route 115 based on the length of the network identifier 106.

In a first example, the routing lookup structure 108 can add new entries to the network identifier entries 110 of the lookup table 108 to capture the new network identifier 106. As mentioned above, the length of the network identifier 106 can affect the number of new entries that must be added to the network identifier entries 110. In a specific example, if the lookup table 108 is configured with sixteen-bit network identifier entries 110, a network identifier 106 that is fifteen bits long will result in at most two new entries due to the difference of one bit.

As such, the addition of new entries can be conditional on the length of the network identifier 106. For instance, the length of the network identifier 106 can satisfy a network identifier length threshold 120 such that the network identifier 106 is less than or equal to a maximum network identifier length 122 and greater than or equal to a minimum network identifier length 124. As with the example discussed above, the lookup table 108 can be configured with network identifier entries 110 that are sixteen bits in length. Accordingly, the maximum network identifier length 122 can be set at sixteen bits.

In addition, the minimum network identifier length 124 can be configured as a difference of the maximum network identifier length 122 to enforce a maximum number of potential additions to the network identifier entries 110. For example, for a given maximum network identifier length 122, the minimum network identifier length 124 can be defined as three bits less than the maximum network identifier length 122. Consequently, regardless of the maximum network identifier length 122, the maximum number of new entries that can result from a given network identifier 106 is eight. In this way, the routing lookup structure can maintain a reasonable size of the lookup table 108.

In a second example, rather than add new entries to the lookup table 108, the routing lookup structure 100 can add the network identifier 106 defined by the route 115 to the default range table 128 in response to determining that the network identifier 106 is less than the minimum network identifier length 124 defined by the network identifier length threshold 120. In addition, a new entry can be added to a set of network identifier entries 130 within the default range table 128 defining the previously unknown network identifier 106. Consequently, any subsequent network packets 102 that contain a destination address 104 that matches the route 115 can be routed in the same way. In this way, the routing lookup structure 100 can accommodate new network identifiers 106 while maintaining a minimal number of entries thereby maximizing the efficiency of the routing lookup structure 100. In addition, the disclosed techniques can further improve the efficiency of the routing lookup structure 100 by reducing the number of programming operations associated with incorporating a new route 115. For example, consider the route 115 discussed above wherein a single entry can be appended to the default range table 128 rather than $2^8$ or 256 entries in the lookup table 108.

Figure 2:
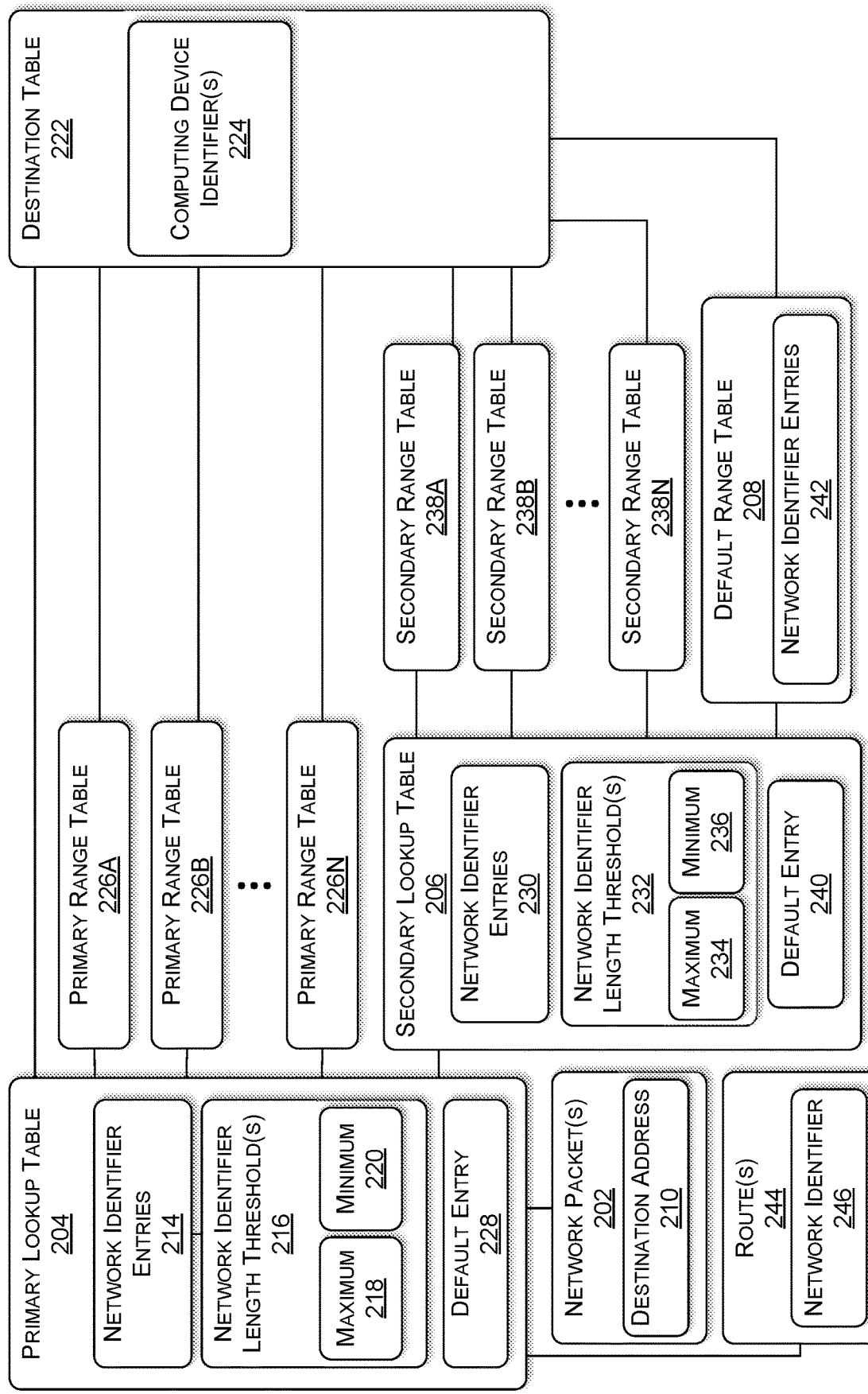
FIG. 2 is a block diagram of a routing lookup structure for routing network packets using a primary lookup table, a secondary lookup table, range tables, and a default range table.

Turning now to FIG. 2, aspects of a routing lookup structure that processes a network packet 202 are shown and described. In various examples, the routing lookup structure 200 can include a primary lookup table 204, a secondary lookup table 206, and a default range table 208. In various examples the default range table 208 can be considered a secondary default range table in that the secondary lookup table 206 replaces the default range table 128 of the examples discussed above. Similar to the examples discussed above with respect to FIG. 1, the routing lookup structure 200 can perform initial processing for the network packet 202 at the primary lookup table 204 based on a constituent destination address 210. As such, the primary lookup table 204 can contain a set of network identifier entries 214 and a network identifier length threshold 216 defining a maximum network identifier length 218 and a minimum network identifier length 220.

In various examples, a computer networking device can utilize the routing lookup structure 100 or the routing lookup structure 200 based on a format of the network packet 202 and/or the destination address 210. For example, the network packet 202 may be formatted to the IPv4 standard wherein the destination address 210 is thirty-two bits in length. As such, the single lookup table 108 and default range table 128 discussed above can be suitable for processing the network packet 202. Alternatively, the network packet 202 may conform to the IPv6 standard wherein the destination address 210 is 128 bits in length. Consequently, the range of possible destination addresses 210 can be significantly greater than in a thirty-two-bit address space which can lead to large range tables and negative performance impacts. As will be discussed below, utilizing a secondary lookup table 206 can enhance efficiency by alleviating the heavy processing loads of a large address space.

Like the examples discussed above, the primary lookup table 204 can compare a first portion of the destination address 210 against the network identifier entries 214 where the size of the first portion is defined by the maximum network identifier length 218. In a specific example, the destination address 210 is an IPv6 address that is 128 bits in length. In this example, the network identifier length threshold 216 can be configured such that the maximum network identifier length 218 is 48 bits in length. However, it should be understood that the maximum network identifier length 218 can be configured as any suitable value based on performance considerations, network conditions, and so forth.

In a first example of processing the network packet 202, the first portion of the destination address 210 can match one of the network identifier entries 214. In some scenarios, the matching network identifier entry 214 can be indexed directly to an entry at a destination table 222 containing a computing device identifier 224. In response, the network packet 202 can be transmitted to a subsequent computing device associated with the computing device identifier 224 indexed by the network identifier entry 214. However, it should be understood that transmitting the network packet 204 to a subsequent computing device can be achieved using any suitable method and may not necessarily utilize the destination table 222. Alternatively, the matching network identifier entry 214 can be indexed to a primary range table 226A of a plurality of primary range tables 226A-226N wherein the destination address 210 can be further compared against more specific (i.e., longer) network identifier entries. Upon a match at the primary range table 226A, the network packet can be subsequently transmitted to a subsequent computing device.

In a second example of processing the network packet 202, the first portion of the destination address 210 can fail to match any of the network identifier entries 214, also known as a no-match result which directs to a default entry 228. A no-match result can be determined in various ways. In a specific example, the primary lookup table 204 can perform a comparison of the first portion of the destination address against the network identifier entries 214 and determine that there are no matches.

In response to a no-match result, the destination address 210 can be provided to the secondary lookup table 206. Like the primary lookup table 204, the secondary lookup table 206 can be configured with a set of network identifier entries 230 and a network identifier length threshold 232 that defines a maximum network identifier length 234 and a minimum network identifier length 236. It should be understood that the network identifier entries 230 and the network identifier length threshold 232 of the secondary lookup table 206 can be configured differently from the network identifier entries 214 and the network identifier length thresholds 216 of the primary lookup table. In a specific example, while the primary lookup table 204 may be configured to examine the first forty-eight bits of a destination address 210, the secondary lookup table 206 can be configured to examine the first twenty-four bits of the destination address 210. In this way, routing lookup structure 200 can process the destination address 210 without overloading the either the default range table 208 or the primary range tables 226A-226N thereby preserving efficiency.

Similar to the primary lookup table 204, the secondary lookup table 206 can determine that a second portion of the destination address 210 (e.g., the first twenty-four bits) matches a network identifier entry 230 where the size of the second portion is defined by the maximum network identifier length 234. Accordingly, the matching network identifier entry 230 can be indexed to a secondary range table 238A of a plurality of secondary range tables 238A-238N wherein the destination address 210 can be further compared against more specific (i.e., longer) network identifier entries. Upon a match at the secondary range table 238A, the network packet can be subsequently transmitted to a subsequent computing device that is associated with a computing device identifier 224 that corresponds to the matching entry within the secondary range table 238A.

Alternatively, the secondary lookup table 206 may also determine that the second portion of the destination address 210 does not match any of the network identifier entries 230, a no-match result. As mentioned above with respect to the primary lookup table 204, the no-match result can be determined from a comparison against the network identifier entries 230. In response, the destination address 210 can be matched to a default entry 240.

In turn, the default entry 240 can direct the destination address 210 to a default range table 208. The network packet 202 can subsequently be transmitted to a subsequent computing device. In this way, instead of creating thousands or even millions of new entries, new entries are created as needed thereby minimizing the size of the routing lookup structure 200. As mentioned above, the default range table 208 can be considered a secondary default range table.

In addition, the routing lookup structure 200 can be configured with a route 244 defining a network identifier 246. Like the examples discussed above, the routing lookup structure 200 can process the new route 244 in various ways depending on the length of the network identifier 246 relative to the network identifier threshold 216 of the primary lookup table 204 and the network identifier length threshold 232 of the secondary lookup table 206. In a first example, the network identifier 246 can satisfy the network identifier length threshold 216 by being less than or equal to the maximum network identifier length 218 and greater than or equal to the minimum network identifier length 220. As discussed above, the minimum network identifier length 220 can be defined as a difference between the maximum network identifier length 218 (e.g., the maximum minus three bits). In a specific example, the network identifier 246 can be forty-six bits in length while the maximum network identifier length 218 can be forty-eight bits and the minimum network identifier length 220 can be forty-five bits. In response, the primary lookup table 204 can be configured with four new entries to capture the forty-six-bit network identifier 246.

In an alternative example, the length of the network identifier 246 may violate or exceed the network identifier length threshold 216 of the primary lookup table 204 but satisfy the network identifier length threshold 232 of the secondary lookup table 206. In various examples, the network identifier length threshold 216 of the primary lookup table 204 can be greater than the network identifier length threshold 232 of the secondary lookup table 206. For instance, the network identifier 246 may be twenty-one bits long while the maximum network identifier length 234 of the secondary lookup table 206 can be twenty-four bits and the minimum network identifier length 236 of the secondary lookup table 206 can be twenty-one bits. In response, the route 244 can be captured in the network identifier entries 230 of the secondary lookup table 206 as eight new entries. As mentioned above, the difference between the length of the network identifier 246 and the maximum network length 218 and/or 234 can dictate the resultant number of new entries.

In another example, the length of the network identifier 246 may violate or exceed both the network identifier length threshold 216 of the primary lookup table 204 and the network identifier length threshold 232 of the secondary lookup table 206. For instance, the network identifier 246 may be eight bits long while the minimum network identifier length 220 of the primary lookup table 204 can be forty-five bits and the minimum network identifier length 236 of the secondary lookup table 206 can be twenty-one bits. In response, the route 244 can be appended to the network identifier entries 242 of the default range table 208.

Figure 3:
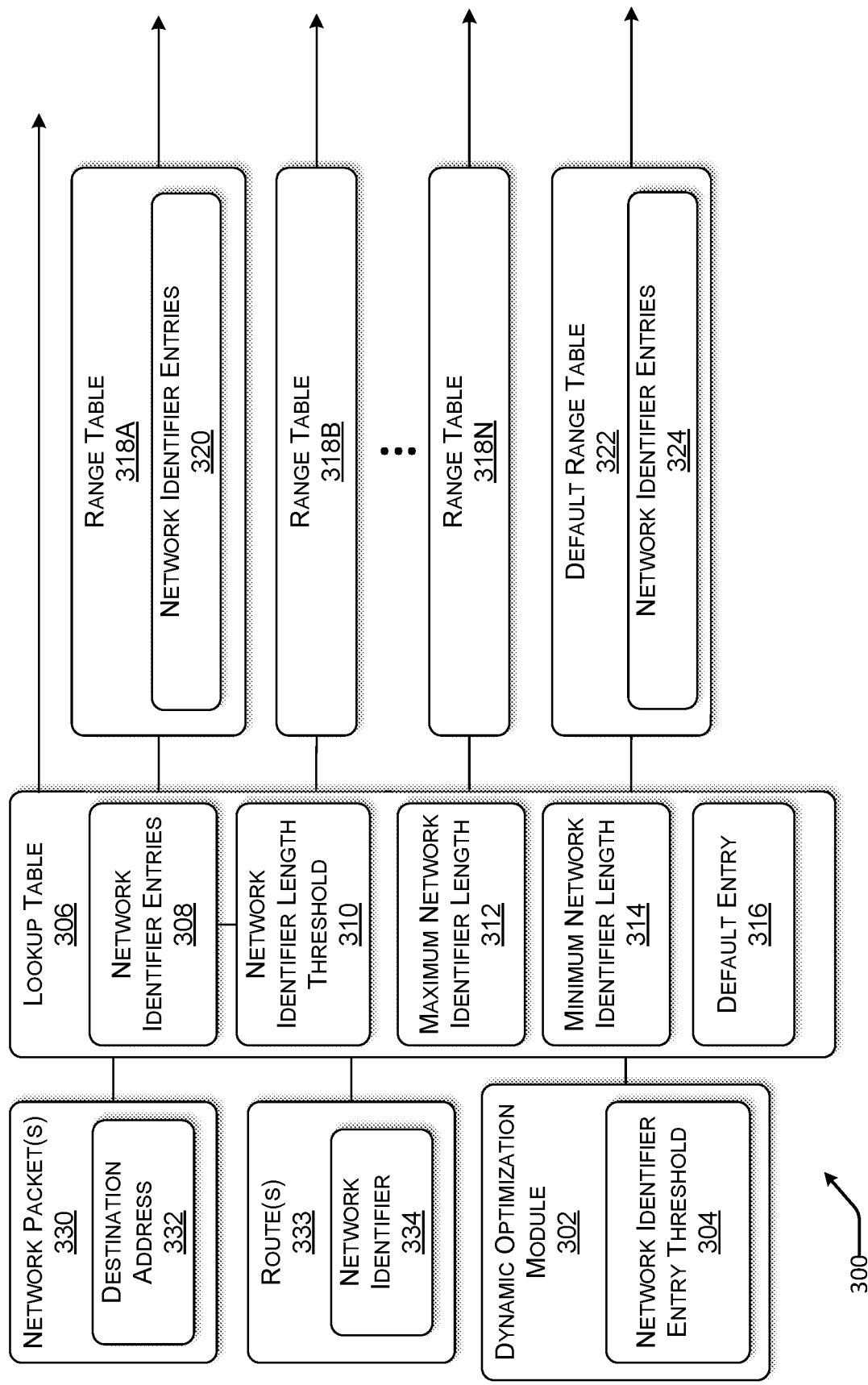
FIG. 3 is a block diagram of a routing lookup structure in which a dynamic optimization module updates the configuration of the lookup table in response to network conditions.

Proceeding to FIG. 3, aspects of a routing lookup structure 300 that is configured with a dynamic optimization module 302 are shown and described. In various examples, the dynamic optimization module 302 can include a network identifier entry threshold 304 that enables the dynamic optimization module 302 to modify the routing lookup structure 300 in response to changing network conditions.

Like the examples discussed above, the routing lookup structure 300 can comprise a lookup table 306 that is configured with a set of network identifier entries 308, a network identifier length threshold 310 that defines a maximum network identifier length 312, a minimum network identifier length 314 and a default entry 316. The lookup table 306 can be coupled to a set of range tables 318A-318N that can each contain their own set of network identifier entries 320. In addition, the default entry 316 of the lookup table 306 can point to a default range table 322 that is also configured with a set of network identifier entries 324. After processing a network packet 330 based on a destination address 332, the routing lookup structure 300 can transmit the network packet 330 to a subsequent computing device.

As in the examples described above, the routing lookup structure 300 can be configured with various routes 333 each defining a corresponding network identifier 334. Accordingly, the route 333 can be processed by the routing lookup structure 300 based on the length of the network identifier 334. In one example, the network identifier 334 can satisfy the network identifier threshold 310 by being less than or equal to the maximum network identifier length 312 and greater than or equal to the minimum network identifier length 314. In response, the route 333 can be captured in the network identifier entries 308 as one or more new entries based on the difference between the length of the network identifier 334 and the maximum network identifier length 312.

It is well known that the performance of reference tables such as the range table 318A may be dependent on the number of entries contained within. That is, an excessive number of network identifier entries 320 can degrade processing speeds when searching through the range table 318A.

As such, after acquiring new routes 333 over time and accordingly adding new network identifiers 334, the number of network identifier entries 320 may exceed the network identifier entry threshold 304 defined by the dynamic optimization module 302. In response, the dynamic optimization module 302 can modify the network identifier length threshold 310 to define a new maximum network identifier length 312. For example, the lookup table 306 can be configured with a maximum network identifier length 312 of forty-eight bits. However, the number of network identifier entries 320 at a range table 318A may have grown to exceed the network identifier entry threshold 304 (e.g., 256 entries). In response, the dynamic optimization module 302 can change the maximum network identifier length 312 to fifty bits. As mentioned above, the minimum network identifier length 314 can also be defined based on the maximum network identifier length 312 (e.g., maximum minus three bits). Consequently, increasing the maximum network identifier length 312 can also cause an increase in the minimum network identifier length 314 to enable the lookup table 306 to rebalance the number of network identifier entries 320 at the range table 318A. Modifications to the network identifier threshold 310 can be determined by the dynamic optimization module 302 such that the number of network identifier entries 308 falls below the network identifier entry threshold 304.

In another example, the dynamic optimization module 302 may detect that the number of network identifier entries 324 of the default range table 322 exceeds the network identifier entry threshold 304. In response, the minimum network identifier length 314 of the lookup table 306 can be decreased (e.g., from 18-bit to 16-bit). In this way, the dynamic optimization module 302 can rebalance the routing lookup structure 300 by increasing the number of network identifier entries 308 at the lookup table 306 while reducing the number of network identifier entries 324 at the default range table 322. Consequently, the performance of the default range table 322 can be maintained within an acceptable window.

Figure 4A:
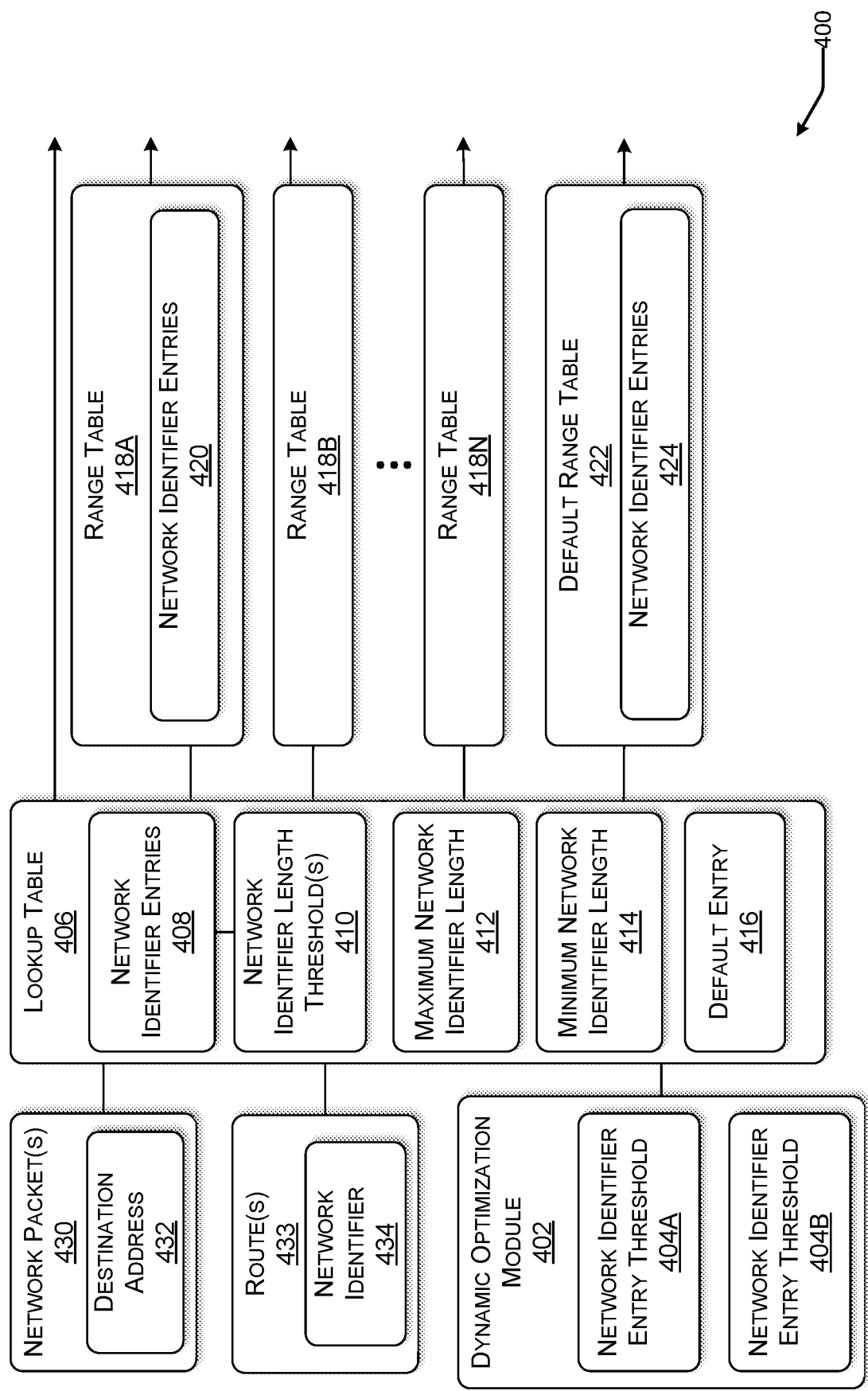
FIG. 4A is a block diagram of a routing lookup structure in which a dynamic optimization module updates components of the routing lookup structure in response to network conditions in a first phase of operation.

Turning now to FIG. 4A, a routing lookup structure 400 is shown and described in which a dynamic optimization module 402 can reconfigure the routing lookup structure 400 based on network identifier entry thresholds 404A and 404B. Similar to the examples discussed above, the routing lookup structure 400 can comprise a lookup table 406 that is configured with a set of network identifier entries 408, a network identifier length threshold 410 that defines a maximum network identifier length 412, a minimum network identifier length 414 and a default entry 416. The lookup table 406 can be coupled to a set of range tables 418A-418N that can each contain their own set of network identifier entries 420. In addition, the default entry 416 of the lookup table 406 can point to a default range table 422 that is also configured with a set of network identifier entries 424. After processing a network packet 430 based on a destination address 432 the routing lookup structure 400 can transmit the network packet 440 to a subsequent computing device.

As in the examples described above, the routing lookup structure 400 can be configured with various routes 433 each defining a corresponding network identifier 434. Accordingly, the route 433 can be processed by the routing lookup structure 400 based on the length the network identifier 434. In one example, the network identifier 434 can satisfy the network identifier threshold 410 by being less than or equal to the maximum network identifier length 412 and greater than or equal to the minimum network identifier length 414. In response, the route 433 can be captured in the network identifier entries 408 as one or more new entries based on the difference between the length of the network identifier 434 and the maximum network identifier length 412.

In an alternative example, the length of the network identifier 434 may violate or exceed the network identifier threshold 410. That is, the length of the network identifier 434 may exceed the maximum network identifier length 412 or be less than the minimum network identifier length 414. As such, the route 433 can be appended to the default range table 422 as a new entry in the network identifier entries 424 if the length of the network identifier 434 is less than the minimum network identifier length 414. Conversely, the route 433 can be appended to an appropriate range table 418A-418N if the length of the network identifier 434 exceeds the maximum network identifier length 412.

In a first example of dynamic optimization functions, the number of routes 433 managed by the routing lookup structure 400 can be small (e.g., 10 routes). As such, searching through a lookup table 406 and subsequently a range table 418A can be unnecessary. Stated another way, for a small number of network identifier entries 420 that falls below a network identifier entry threshold 404A, the routing lookup structure 400 can efficiently process various network packets 430 with a single range table 418A and without the lookup table 406. Accordingly, the dynamic optimization module 402 can bypass and/or otherwise disable the lookup table 406 such that the destination address 432 is processed by the range table 418A and not the lookup table 406.

After acquiring routes 433 over time however, the number of network identifier entries 420 may grow exceed a second network identifier entry threshold 404B (e.g., 256). In a second example of dynamic optimization functions, the dynamic optimization module 402 can proceed to activate the lookup table 406 in response to the number of network identifier entries 420 exceeding the second network identifier entry threshold 404B. Consequently, a destination address 432 for a network packet 430 can receive an initial comparison against the network identifier entries 408 at the lookup table 406 before proceeding to one of a plurality of range tables 418A-418N for further matching and subsequent transmission as discussed in other examples above.

Figure 4B:
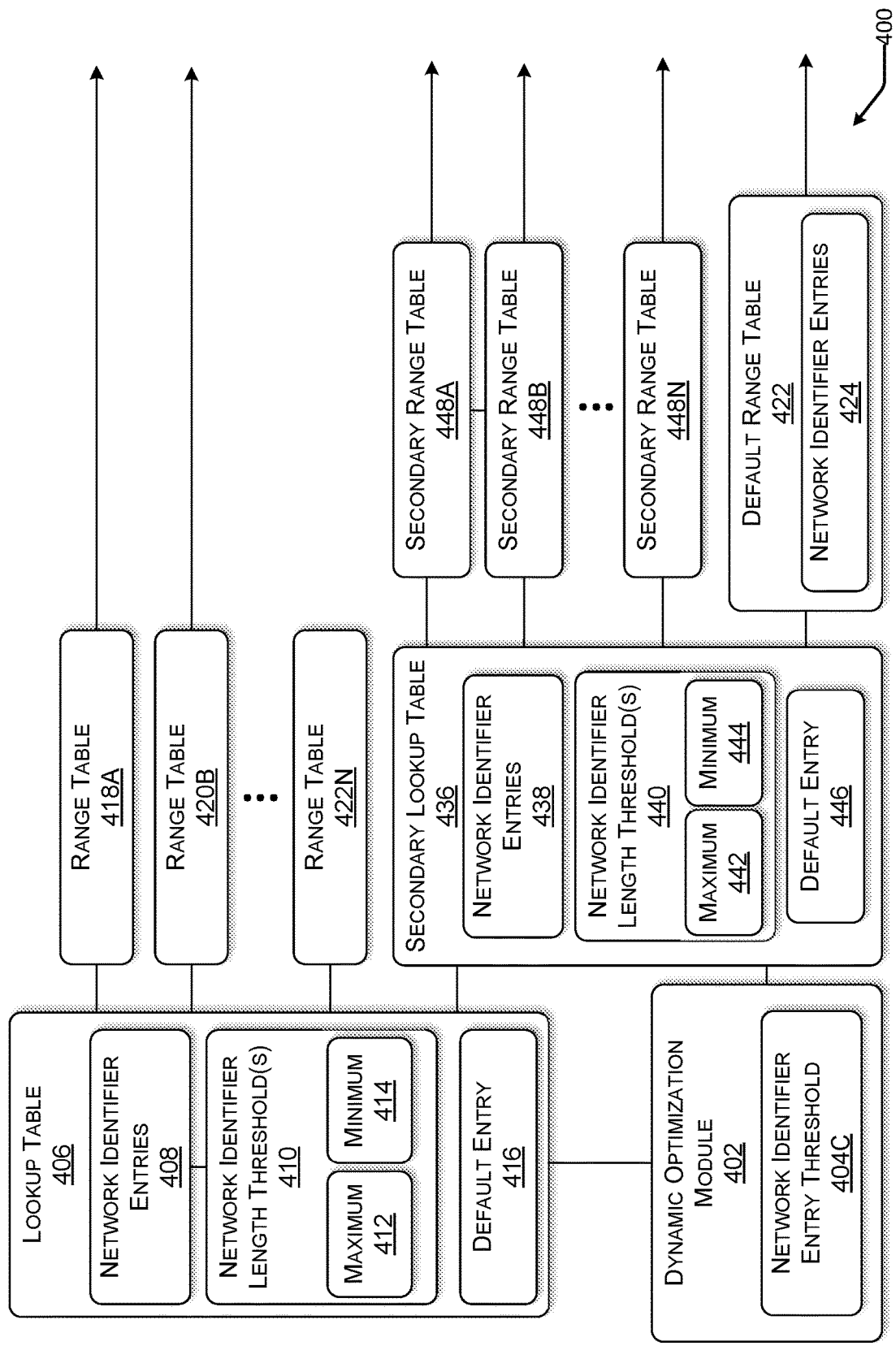
FIG. 4B is a block diagram of a routing lookup structure in which a dynamic optimization module updates components of the routing lookup structure in response to network conditions in a second phase of operation.

Turning now to FIG. 4B, a further example of dynamic optimization functions is shown and described. As mentioned above with respect to FIG. 4A, the routing lookup structure 400 can store routes 433 and associated network identifiers 434 within the network identifier entries 408 of a lookup table 406, the network identifier entries 420 of a range table 418A, and/or the network identifier entries 424 of a default range table 422. However, like in the examples described above, the number of network identifier entries 420 at the range table 418A can also grow over time in response to new routes 433 and exceed a third network identifier entry threshold 404C. In response, the dynamic optimization module 402 can further reconfigure the routing lookup structure 400 with a secondary lookup table 436. As such, a destination address 432 that does not match any of the network identifier entries 408 (e.g., a no-match result) can receive additional processing at the secondary lookup table 436.

As discussed above, the secondary lookup table 436 can operate similarly to the primary lookup table 406 by comparing a first portion of the destination address 432 against a set of network identifier entries 438. The size of the first portion can be defined by a network identifier length threshold 440 as a maximum network identifier length 442. In various examples, the secondary lookup table 436 can generate a no-match result should the first portion of the destination address fail to match any of the network identifier entries 438. Consequently, the destination address 432 can be matched to the default entry 446. As such, rather than process the network packet 430 at one of a second plurality of range tables 448A-448N, the default entry 446 can cause the default range table 422 to handle routing the network packet 430. As shown in FIGS. 4A and 4B, the dynamic optimization module 402 can enable the routing lookup structure 400 to adapt to changing network conditions, characteristics of network packets 430, and so forth to optimize the size of the range tables 418A-418N and the default range table 422 as necessary thereby maximizing efficiency. It should be understood that the operations of the dynamic optimization module 402 can be performed automatically and/or manually without disabling or otherwise disrupting network services.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provides federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 5:
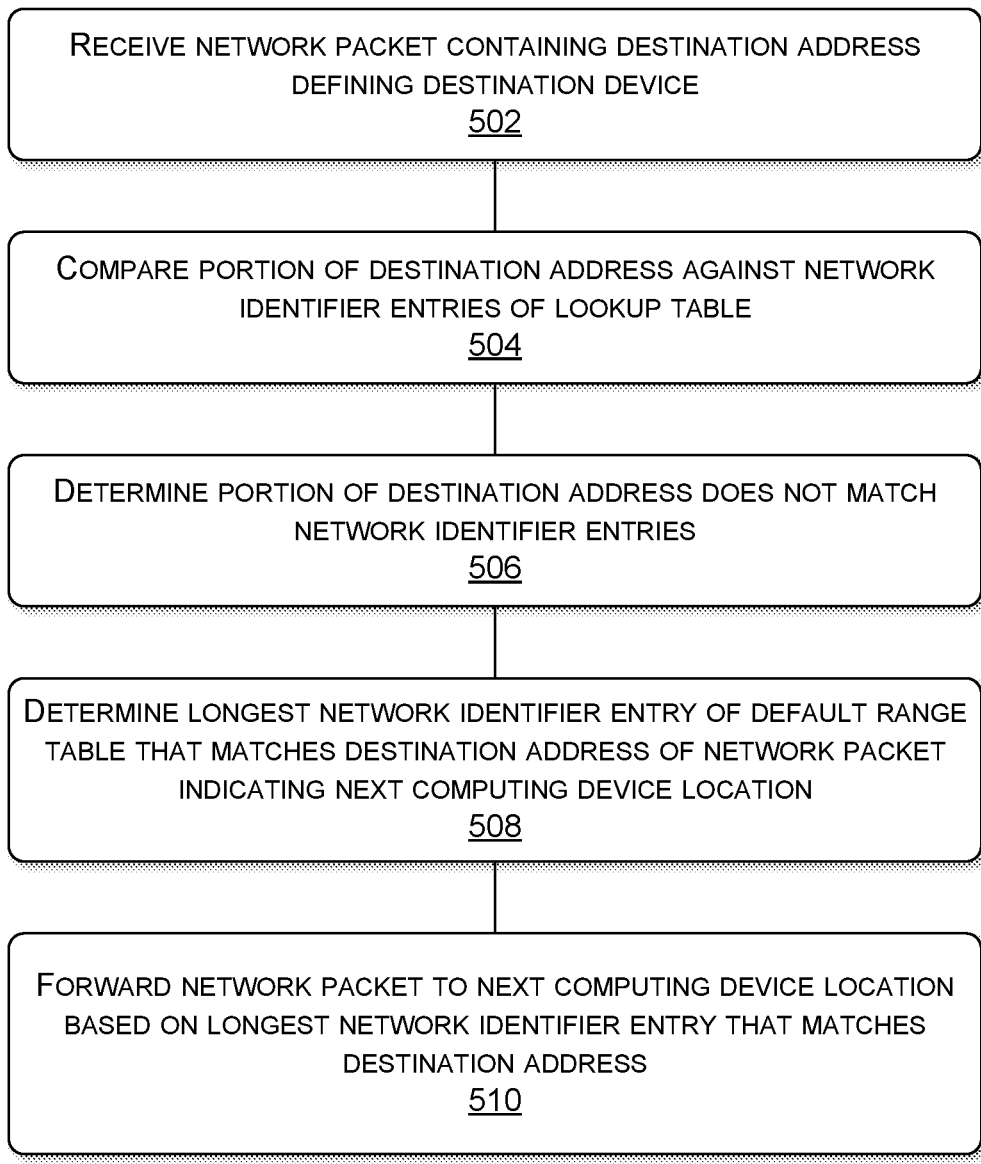
FIG. 5 is a flow diagram showing aspects of a routine for processing a network packet based on a destination address using a routing lookup structure.

Proceeding now to FIG. 5, aspects of a routine 500 for performing, by a packet processing function of a computing device in a computing network, network packet routing utilizing a routing lookup structure, the routing lookup structure containing a plurality of next computing device locations in the computing network to which packets can be routed, the routing lookup structure including a lookup table configured with a plurality of network identifier entries and a default range table that stores routes having a network identifier that is less than a minimum network identifier length of the lookup table, wherein a route having a network identifier that is less than the minimum network identifier length is automatically appended to the default range table are shown and described. With reference to FIG. 5, the routine 500 begins at operation 502 where a system receives a network packet containing a destination address, the destination address defining a location of a destination computing device.

Next, at operation 504, the system compares a portion of the destination address against the network identifier entries of the lookup table.

Then, at operation 506, the routing lookup structure determines that the portion of the destination address does not match any entries of the plurality of entries of the lookup table.

Proceeding to operation 508, in response to determining that the portion of the destination address does not match any network identifier entry of the plurality of network identifier entries of the lookup table, the routing lookup structure determines a longest network identifier entry of the default range table of the routing lookup structure that matches the destination address of the network packet, wherein the longest network identifier entry is indicative of one of the next computing device locations in the computing network.

Finally, at operation 510, the system forwards the network packet to the one of the next computing device locations based on the longest network identifier entry of the default range table.

Figure 6:
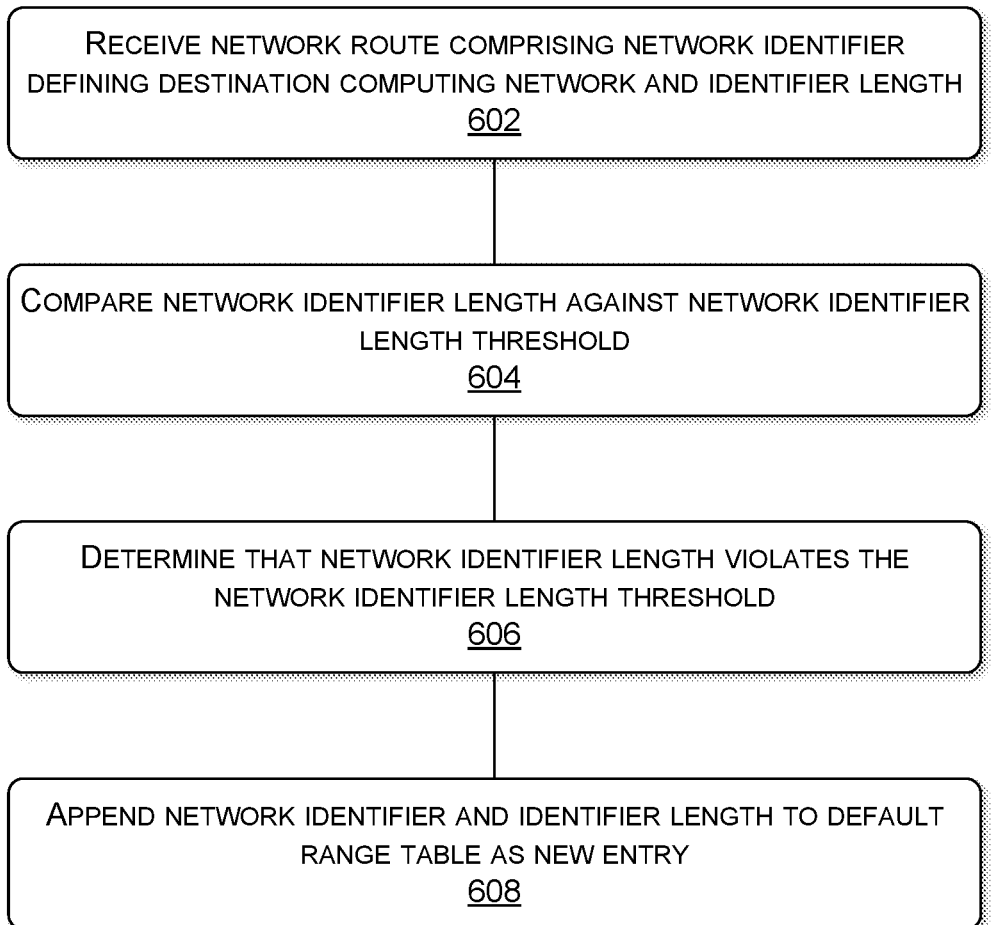
FIG. 6 is a flow diagram showing aspects of a routine for configuring a routing lookup structure in a computer networking device with a network route in a software defined network.

Proceeding now to FIG. 6, aspects of a routine 600 for configuring a routing lookup structure with a network route are shown and described. With reference to FIG. 6, the routine 600 begins at operation 602 where a system receives a network route comprising a network identifier defining a destination computing network and a network identifier length.

Next, at operation 604, the network identifier length is compared against a network identifier length threshold configured in the lookup table.

Then, at operation 606, the lookup table determines that the network identifier length violates a network identifier length threshold configured in the lookup table.

Finally at operation 608, in response to determining that the network identifier length violates the network identifier length threshold, the network identifier of the network route is appended to a default range table as a new entry.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 and/or 600 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 and/or 600 may be also implemented in other ways. In addition, one or more of the operations of the routine 500 and/or 600 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 7:
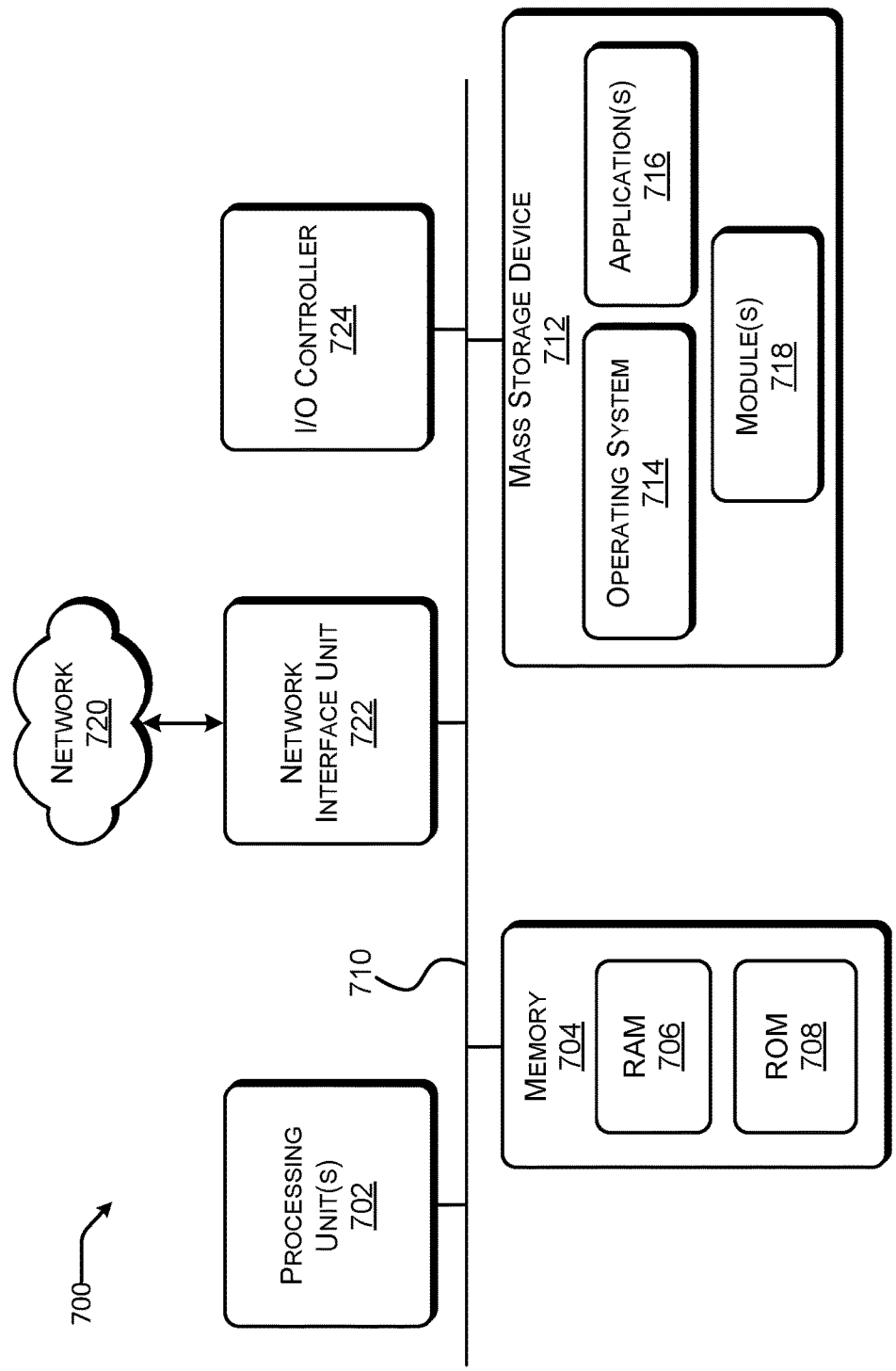
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the cloud-based platform or system 700, capable of executing computer instructions (e.g., a module or a program component described herein). The computer architecture 700 illustrated in FIG. 7 includes processing system 702, a system memory 704, including a random-access memory 706 (RAM) and a read-only memory (ROM) 708, and a system bus 710 that couples the memory 704 to the processing system 702. The processing system 702 comprises processing unit(s). In various examples, the processing unit(s) of the processing system 702 are distributed. Stated another way, one processing unit of the processing system 702 may be located in a first location (e.g., a rack within a datacenter) while another processing unit of the processing system 702 is located in a second location separate from the first location.

Processing unit(s), such as processing unit(s) of processing system 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing system 702 through a mass storage controller connected to the bus 710. The mass storage device 712 and its associated computer-readable media provide non-volatile storage for the computer architecture 700. Although the description of computer-readable media contained herein refers to a mass storage device, the computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

The software components described herein may, when loaded into the processing system 702 and executed, transform the processing system 702 and the overall computer architecture 700 from a general-purpose computing system into a special-purpose computing system customized to facilitate the functionality presented herein. The processing system 702 may be constructed from any number of transistors or other discrete circuit elements, which may individually or collectively assume any number of states. More specifically, the processing system 702 may operate as a finite-state machine, in response to executable instructions contained within the software modules disclosed herein. These computer-executable instructions may transform the processing system 702 by specifying how the processing system 702 transition between states, thereby transforming the transistors or other discrete hardware elements constituting the processing system 702.

Figure 8:
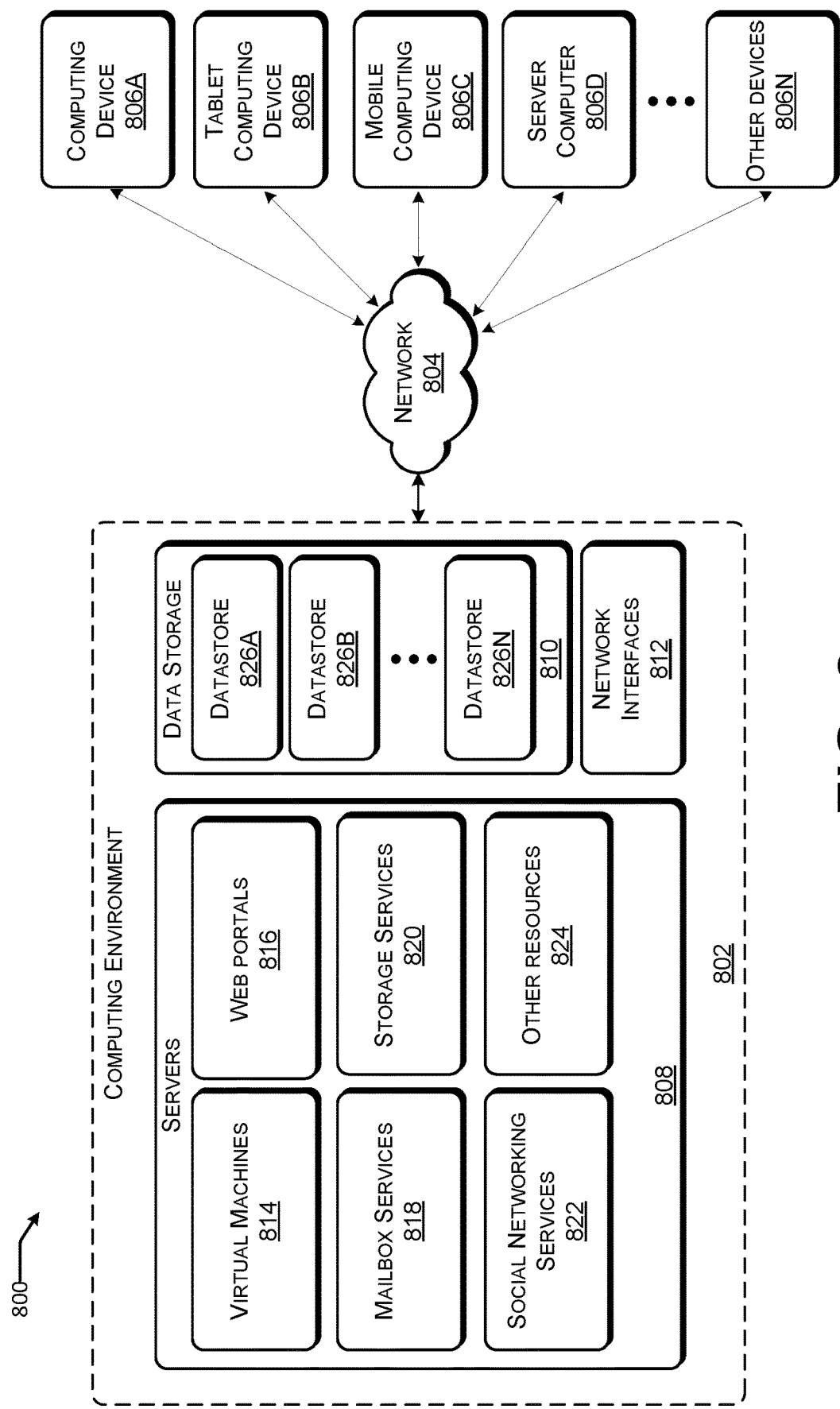
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "computing devices 806") can communicate with the computing environment 802 via the network 804. In one illustrated configuration, the computing devices 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of computing devices 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 800. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a method for performing, by a packet processing function of a computing device in a computing network, network packet routing utilizing a routing lookup structure, the routing lookup structure containing a plurality of next computing device locations in the computing network to which packets can be routed, the routing lookup structure including a lookup table configured with a plurality of network identifier entries and a default range table that stores routes having a network identifier that is less than a minimum network identifier length of the lookup table, wherein a route having a network identifier that is less than the minimum network identifier length is automatically appended to the default range table, the method comprising: receiving a network packet containing a destination address indicative of a location of a destination computing device; comparing a portion of the destination address against the plurality of network identifier entries of the lookup table of the routing lookup structure, wherein a size of the portion of the destination address is defined by a predetermined value configured in the lookup table; determining that the portion of the destination address does not match any network identifier entry of the plurality of network identifier entries of the lookup table; in response to determining that the portion of the destination address does not match any network identifier entry of the plurality of network identifier entries of the lookup table, determining a longest network identifier entry of the default range table of the routing lookup structure that matches the destination address of the network packet, wherein the longest network identifier entry is indicative of one of the next computing device locations in the computing network; and forwarding the network packet to the one of the next computing devices based on the longest network identifier entry of the default range table, wherein the size of the portion of the destination address defined by the predetermined value configured in the lookup table is automatically updated based on a size of the default range table.

Example Clause B, the method of Example Clause A, wherein the computing network is a mobile edge computing environment utilizing a 5G cellular network.

Example Clause C, the method of Example Clause A or Example Clause B, wherein the routing lookup structure comprises the lookup table and a range table containing a plurality of network identifier entries, the method further comprising: determining that the plurality of network identifier entries of a range table of the routing lookup structure exceeds a threshold number of network identifier entries; and in response to determining that the plurality of network identifier entries of the range table of the routing lookup structure exceeds the threshold number of network identifier entries, modifying the predetermined value configured in the lookup table to increase the size of the portion of the destination address.

Example Clause D, the method of any one of Example Clause A through C, wherein the network packet is a first network packet, the destination computing device is a first destination computing device, and the one of the next computing device locations is a first one of the next computing device locations, the method further comprising: receiving a second network packet containing a second destination address defining a location of a second destination computing device; comparing a portion of the second destination address against the plurality of network identifier entries of the lookup table of the routing lookup structure; determining that the portion of the second destination address matches a network identifier entry of the plurality of network identifier entries of the lookup table; in response to determining that the portion of the second destination address matches the entry of the plurality of network identifier entries of the lookup table, comparing the second destination address to a plurality of network identifier entries of a range table; determining that the destination address does not match any network identifier entry of the plurality of network identifier entries of the range table; and in response to determining that the destination address does not match any network identifier entry of the plurality of network identifier entries of the range table, determining a longest network identifier entry of the default range table of the routing lookup structure that matches the destination address of the second network packet, wherein the longest network identifier entry is indicative of a second one of the next computing device locations in the computing network; and forwarding the network packet to the second one of the next computing devices based on the longest network identifier entry of the default range table.

Example Clause E, the method of any one of Example Clause A through D, wherein the default range table of the routing lookup structure is a secondary lookup table and the portion is a first portion, and a size of a second portion of the destination address is defined by a predetermined value configured in the secondary lookup table, the method further comprising: comparing the second portion of the destination address against a second plurality of network identifier entries of the secondary lookup table; determining that the second portion of the destination address does not match any network identifier entry of the second plurality of network identifier entries of the secondary lookup table indicating that the second portion of the destination address is not contained in the secondary lookup table; and in response to determining that the second portion of the destination address does not match any network identifier entry of the second plurality of network identifier entries of the secondary lookup table, determining a longest network identifier entry of a secondary default range table of the routing lookup structure that matches the destination address of the network packet, wherein the longest network identifier entry is indicative of one of the next computing device locations in the computing network; and forwarding the network packet to the one of the next computing device locations based on the longest network identifier entry of the secondary default range table.

Example Clause F, the method of any one of Example Clause A through E, wherein a size of the second portion of the destination address is less than a size of the first portion of the destination address.

Example Clause G, the method of any one of Example Clause A through F, wherein the plurality of network identifiers is a first plurality of network identifiers and the routing lookup structure comprises the lookup table and a range table containing a second plurality of network identifier entries, the method further comprising: determining that the second plurality of network identifier entries of the range table exceeds a threshold number of network identifier entries; in response to determining that the second plurality of network identifier entries exceeds the threshold number of network identifier entries: modifying the predetermined value configured in the lookup table to increase the size of the portion of the destination address; and configuring the default range table as a secondary lookup table.

Example Clause H, a system for performing, by a packet processing function of a computing device in a computing network, network packet routing utilizing a routing lookup structure, the routing lookup structure containing a plurality of next computing devices in the computing network to which packets can be routed, the system comprising a processor and memory, the memory storing: a lookup table of the routing lookup structure configured with a plurality of network identifier entries; one or more range tables of the routing lookup structure configured with another plurality of network identifier entries; and a default range table of the routing lookup structure configured with a third plurality of network identifier entries; the memory further storing computer readable instructions that when executed by the processor, cause the system to: receive a network packet containing a destination address indicative of a location of a destination computing device; compare a portion of the destination address against the plurality of network identifier entries of the lookup table of the routing lookup structure; determine that the portion of the destination address does not match any network identifier entry of the plurality of network identifier entries of the lookup table; in response to determining that the portion of the destination address does not match any network identifier entry of the plurality of network identifier entries of the lookup table, determine a longest network identifier entry of the default range table of the routing lookup structure that matches the destination address of the network packet, wherein the longest network identifier entry is indicative of one of the next computing devices in the computing network; and forward the network packet to the one of the next computing devices based on the longest network identifier entry of the default range table.

Example Clause I, the system of Example Clause H, wherein a size of the portion of the destination address is defined by a predetermined value configured in the lookup table of the routing lookup structure.

Example Clause J, the system of Example Clause I, wherein the routing lookup structure comprises the lookup table and a range table containing a plurality of network identifier entries, and the computer readable instructions further cause the system to: determine that the plurality of network identifier entries of a range table of the routing lookup structure exceeds a threshold number of network identifier entries; and in response to determining that the plurality of network identifier entries of the range table of the routing lookup structure exceeds the threshold number of network identifier entries, modify the predetermined value configured in the lookup table to increase the size of the portion of the destination address.

Example Clause K, the system of Example Clause I, wherein the computer readable instructions further cause the system to: determine that a plurality of network identifier entries of the default range table exceeds a threshold number of network identifier entries; and in response to determining that the plurality of network identifier entries of the default range table exceeds the threshold number of entries, modify the predetermined value configured by the lookup table is modified to decrease the size of the portion of the destination address.

Example Clause L, the system of any one of Example Clause H through K, wherein the network packet is a first network packet, the destination computing device is a first destination computing device, and the one of the next computing devices is a first one of the next computing devices, the computer readable instructions further causing the system to: receive a second network packet containing a second destination address defining a location of a second destination computing device; compare a portion of the second destination address against the plurality of network identifier entries of the lookup table of the routing lookup structure; determine that the portion of the second destination address matches a network identifier entry of the plurality of network identifier entries of the lookup table; in response to determining that the portion of the second destination address matches the network identifier entry of the plurality of network identifier entries of the lookup table, compare the second destination address to a plurality of network identifier entries of a range table; determine that the destination address does not match any network identifier entry of the plurality of network identifier entries of the range table; and in response to determining that the destination address does not match any network identifier entry of the plurality of network identifier entries of the range table, determine a longest network identifier entry of the default range table of the routing lookup structure that matches the destination address of the second network packet, wherein the longest network identifier entry is indicative of a second one of the next computing devices in the computing network; and forward the network packet to the second one of the next computing devices based on the longest network identifier entry of the default range table.

Example Clause M, the system of any one of Example Clause H through K, The system of claim 8, wherein the default range table of the routing lookup structure is a secondary lookup table and the portion is a first portion, and a size of a second portion of the destination address is defined by a predetermined value configured in the secondary lookup table, the computer readable instructions further causing the system to: compare the second portion of the destination address against a second plurality of network identifier entries of the secondary lookup table; determine that the second portion of the destination address does not match any network identifier entry of the second plurality of network identifier entries of the secondary lookup table indicating that the second portion of the destination address is not contained in the secondary lookup table; and in response to determining that the second portion of the destination address does not match any network identifier entry of the second plurality of network identifier entries of the secondary lookup table, determine a longest network identifier entry of a secondary default range table of the routing lookup structure that matches the destination address of the network packet, wherein the longest network identifier entry is indicative of one of the next computing devices in the computing network; and forward the network packet to the one of the next computing devices based on the longest network identifier entry of the secondary default range table.

Example Clause N, the system of Example Clause M, wherein a size of the second portion of the destination address is less than a size of the first portion of the destination address.

Example Clause O, the system of any one of Example Clause H through K, wherein a size of the portion of the destination address is defined by a predetermined value configured in the lookup table of the routing lookup structure and the routing lookup structure comprises the lookup table and a range table containing a plurality of network identifier entries, and the computer readable instructions further cause the system to: determine that the plurality of network identifier entries of the range table exceeds a threshold number of network identifier entries; in response to determining that the plurality of network identifier entries exceeds the threshold number of network identifier entries: modify the predetermined value configured in the lookup table to increase the size of the portion of the destination address; and configuring the default range table as a secondary lookup table.

Example Clause P, a method for performing, by a route programming function of a computing device in a computing network, network route configuration of a lookup table in a routing lookup structure, the method comprising: receiving a network route comprising a network identifier indicative of a destination computing network and a network identifier length; comparing the network identifier length against a network identifier length threshold configured in the lookup table; determining that the network identifier length of the network route violates the network identifier length threshold; and in response to determining that the network identifier length violates the network identifier length threshold, appending the network identifier and the network identifier length of the network route to a default range table as a new network identifier entry.

Example Clause Q, the method of Example Clause P, wherein: the network identifier length threshold is a minimum network identifier length; and determining that the network identifier length of the network route violates the network identifier length threshold comprises determining that the network identifier length of the network route is less than the minimum network identifier length.

Example Clause R, the method of Example Clause Q, wherein: the network identifier length threshold includes a maximum network identifier length; the network identifier length threshold includes a minimum network identifier length; and the minimum network identifier length is defined based on the maximum network identifier length.

Example Clause S, the method of Example Clause Q or Example Clause R, wherein the network route is a first network route, the network identifier is a first network identifier, the destination computing network is a first destination computing network, the network identifier length is a first network identifier length, the lookup table is a primary lookup table, the network identifier length threshold is a first network identifier length threshold and the routing lookup structure further comprises a secondary lookup table, the method further comprising: receiving a second network route comprising a second network identifier defining a second destination computing network and a second network identifier length; comparing the second network identifier length against the network identifier length threshold configured in the lookup table; determining that the second network identifier length exceeds the network identifier length threshold; in response to determining that the network identifier length exceeds the network identifier length threshold, comparing the second network identifier length against a second network identifier length threshold configured in the secondary table; determining that the second network identifier length exceeds a second network identifier length threshold configured in the secondary lookup table; and in response to determining that the second network identifier length exceeds the second network identifier length threshold, appending the second network identifier and the second network identifier length of the second network route to the default range table as a new entry.

Example Clause T, the method of Example Clause Q or Example Clause R, wherein the network route is a first network route, the network identifier is a first network identifier, the destination computing network is a first destination computing network, the network identifier length is a first network identifier length, the lookup table is a primary lookup table, the network identifier length threshold is a first network identifier length threshold and the routing lookup structure further comprises a secondary lookup table, the method further comprising: receiving a second network route comprising a second network identifier defining a second destination computing network and a second network identifier length; comparing the second network identifier length against the network identifier length threshold configured in the lookup table; determining that the network identifier length exceeds the network identifier length threshold; in response to determining that the network identifier length exceeds the network identifier length threshold, comparing the second network identifier length against a second network identifier length threshold configured in the secondary table; determining that the network identifier length satisfies another network identifier length threshold configured in the secondary lookup table; and in response to determining that the second network identifier length satisfies the second network identifier length threshold, appending the second network identifier and the second network identifier length of the second network route to the secondary lookup table as a new entry.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different range tables).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for performing, by a packet processing function of a computing device in a computing network, network packet routing utilizing a routing lookup structure, the routing lookup structure containing a plurality of next computing device locations in the computing network to which packets can be routed, the routing lookup structure including a lookup table configured with a plurality of network identifier entries and a default range table that stores routes having a network identifier that is less than a minimum network identifier length of the lookup table, wherein a route having a network identifier that is less than the minimum network identifier length is automatically appended to the default range table, the method comprising:

receiving a network packet containing a destination address indicative of a location of a destination computing device;

comparing a portion of the destination address against the plurality of network identifier entries of the lookup table of the routing lookup structure, wherein a size of the portion of the destination address is defined by a predetermined value configured in the lookup table;

determining that the portion of the destination address does not match any network identifier entry of the plurality of network identifier entries of the lookup table;

in response to determining that the portion of the destination address does not match any network identifier entry of the plurality of network identifier entries of the lookup table, determining a longest network identifier entry of the default range table of the routing lookup structure that matches the destination address of the network packet, wherein the longest network identifier entry is indicative of one of the next computing device locations in the computing network; and forwarding the network packet to the one of the next computing device locations based on the longest network identifier entry of the default range table, wherein the size of the portion of the destination address defined by the predetermined value configured in the lookup table is automatically updated based on a size of the default range table.

2. The method of claim 1, wherein the computing network is a mobile edge computing environment utilizing a 5G network.

3. The method of claim 1, wherein the routing lookup structure comprises the lookup table and a range table containing a plurality of network identifier entries, the method further comprising:

determining that the plurality of network identifier entries of a range table of the routing lookup structure exceeds a threshold number of network identifier entries; and in response to determining that the plurality of network identifier entries of the range table of the routing lookup structure exceeds the threshold number of network identifier entries, modifying the predetermined value configured in the lookup table to increase the size of the portion of the destination address.

4. The method of claim 1, wherein the network packet is a first network packet, the destination computing device is a first destination computing device, and the one of the next computing device locations is a first one of the next computing device locations, the method further comprising:

receiving a second network packet containing a second destination address defining a location of a second destination computing device;

comparing a portion of the second destination address against the plurality of network identifier entries of the lookup table of the routing lookup structure;

determining that the portion of the second destination address matches a network identifier entry of the plurality of network identifier entries of the lookup table;

in response to determining that the portion of the second destination address matches the entry of the plurality of network identifier entries of the lookup table, comparing the second destination address to a plurality of network identifier entries of a range table;

determining that the destination address does not match any network identifier entry of the plurality of network identifier entries of the range table; and in response to determining that the destination address does not match any network identifier entry of the plurality of network identifier entries of the range table, determining a longest network identifier entry of the default range table of the routing lookup structure that matches the destination address of the second network packet, wherein the longest network identifier entry is indicative of a second one of the next computing device locations in the computing network; and forwarding the network packet to the second one of the next computing devices based on the longest network identifier entry of the default range table.

5. The method of claim 1, wherein the default range table of the routing lookup structure is a secondary lookup table and the portion is a first portion, and a size of a second portion of the destination address is defined by a predetermined value configured in the secondary lookup table, the method further comprising:

comparing the second portion of the destination address against a second plurality of network identifier entries of the secondary lookup table;

determining that the second portion of the destination address does not match any network identifier entry of the second plurality of network identifier entries of the secondary lookup table indicating that the second portion of the destination address is not contained in the secondary lookup table; and in response to determining that the second portion of the destination address does not match any network identifier entry of the second plurality of network identifier entries of the secondary lookup table, determining a longest network identifier entry of a secondary default range table of the routing lookup structure that matches the destination address of the network packet, wherein the longest network identifier entry is indicative of one of the next computing device locations in the computing network; and forwarding the network packet to the one of the next computing device locations based on the longest network identifier entry of the secondary default range table.

6. The method of claim 5, wherein a size of the second portion of the destination address is less than a size of the first portion of the destination address.

7. The method of claim 1, wherein the plurality of network identifiers is a first plurality of network identifiers and the routing lookup structure comprises the lookup table and a range table containing a second plurality of network identifier entries, the method further comprising:

determining that the second plurality of network identifier entries of the range table exceeds a threshold number of network identifier entries;

in response to determining that the second plurality of network identifier entries exceeds the threshold number of network identifier entries:

modifying the predetermined value configured in the lookup table to increase the size of the portion of the destination address; and configuring the default range table as a secondary lookup table.

8. A system for performing, by a packet processing function of a computing device in a computing network, network packet routing utilizing a routing lookup structure, the routing lookup structure containing a plurality of next computing devices in the computing network to which packets can be routed, the system comprising a processor and memory, the memory storing:

a lookup table of the routing lookup structure configured with a plurality of network identifier entries;

one or more range tables of the routing lookup structure configured with another plurality of network identifier entries; and a default range table of the routing lookup structure configured with a third plurality of network identifier entries;

the memory further storing computer readable instructions that when executed by the processor, cause the system to:

receive a network packet containing a destination address indicative of a location of a destination computing device;

compare a portion of the destination address against the plurality of network identifier entries of the lookup table of the routing lookup structure;

determine that the portion of the destination address does not match any network identifier entry of the plurality of network identifier entries of the lookup table;

in response to determining that the portion of the destination address does not match any network identifier entry of the plurality of network identifier entries of the lookup table, determine a longest network identifier entry of the default range table of the routing lookup structure that matches the destination address of the network packet, wherein the longest network identifier entry is indicative of one of the next computing devices in the computing network; and forward the network packet to the one of the next computing devices based on the longest network identifier entry of the default range table.

9. The system of claim 8, wherein a size of the portion of the destination address is defined by a predetermined value configured in the lookup table of the routing lookup structure.

10. The system of claim 9, wherein the routing lookup structure comprises the lookup table and a range table containing a plurality of network identifier entries, and the computer readable instructions further cause the system to:

determine that the plurality of network identifier entries of a range table of the routing lookup structure exceeds a threshold number of network identifier entries; and in response to determining that the plurality of network identifier entries of the range table of the routing lookup structure exceeds the threshold number of network identifier entries, modify the predetermined value configured in the lookup table to increase the size of the portion of the destination address.

11. The system of claim 9, wherein the computer readable instructions further cause the system to:

determine that a plurality of network identifier entries of the default range table exceeds a threshold number of network identifier entries; and in response to determining that the plurality of network identifier entries of the default range table exceeds the threshold number of entries, modify the predetermined value configured by the lookup table is modified to decrease the size of the portion of the destination address.

12. The system of claim 8, wherein the network packet is a first network packet, the destination computing device is a first destination computing device, and the one of the next computing devices is a first one of the next computing devices, the computer readable instructions further causing the system to:

receive a second network packet containing a second destination address defining a location of a second destination computing device;

compare a portion of the second destination address against the plurality of network identifier entries of the lookup table of the routing lookup structure;

determine that the portion of the second destination address matches a network identifier entry of the plurality of network identifier entries of the lookup table;

in response to determining that the portion of the second destination address matches the network identifier entry of the plurality of network identifier entries of the lookup table, compare the second destination address to a plurality of network identifier entries of a range table;

determine that the destination address does not match any network identifier entry of the plurality of network identifier entries of the range table; and in response to determining that the destination address does not match any network identifier entry of the plurality of network identifier entries of the range table, determine a longest network identifier entry of the default range table of the routing lookup structure that matches the destination address of the second network packet, wherein the longest network identifier entry is indicative of a second one of the next computing devices in the computing network; and forward the network packet to the second one of the next computing devices based on the longest network identifier entry of the default range table.

13. The system of claim 8, wherein the default range table of the routing lookup structure is a secondary lookup table and the portion is a first portion, and a size of a second portion of the destination address is defined by a predetermined value configured in the secondary lookup table, the computer readable instructions further causing the system to:

compare the second portion of the destination address against a second plurality of network identifier entries of the secondary lookup table;

determine that the second portion of the destination address does not match any network identifier entry of the second plurality of network identifier entries of the secondary lookup table indicating that the second portion of the destination address is not contained in the secondary lookup table; and in response to determining that the second portion of the destination address does not match any network identifier entry of the second plurality of network identifier entries of the secondary lookup table, determine a longest network identifier entry of a secondary default range table of the routing lookup structure that matches the destination address of the network packet, wherein the longest network identifier entry is indicative of one of the next computing devices in the computing network; and forward the network packet to the one of the next computing devices based on the longest network identifier entry of the secondary default range table.

14. The system of claim 13, wherein a size of the second portion of the destination address is less than a size of the first portion of the destination address.

15. The system of claim 8, wherein a size of the portion of the destination address is defined by a predetermined value configured in the lookup table of the routing lookup structure and the routing lookup structure comprises the lookup table and a range table containing a plurality of network identifier entries, and the computer readable instructions further cause the system to:

determine that the plurality of network identifier entries of the range table exceeds a threshold number of network identifier entries;

in response to determining that the plurality of network identifier entries exceeds the threshold number of network identifier entries:

modify the predetermined value configured in the lookup table to increase the size of the portion of the destination address; and configuring the default range table as a secondary lookup table.

16. A system for performing network packet routing utilizing a routing lookup structure, the routing lookup structure containing a plurality of next computing device locations in a computing network to which packets can be routed, the routing lookup structure including a lookup table configured with a plurality of network identifier entries and a default range table that stores routes having a network identifier that is less than a minimum network identifier length of the lookup table, wherein a route having a network identifier that is less than the minimum network identifier length is automatically appended to the default range table, the system comprising:

means for receiving a network packet containing a destination address indicative of a location of a destination computing device;

means for comparing a portion of the destination address against the plurality of network identifier entries of the lookup table of the routing lookup structure, wherein a size of the portion of the destination address is defined by a predetermined value configured in the lookup table;

means for determining that the portion of the destination address does not match any network identifier entry of the plurality of network identifier entries of the lookup table;

means for in response to determining that the portion of the destination address does not match any network identifier entry of the plurality of network identifier entries of the lookup table, determining a longest network identifier entry of the default range table of the routing lookup structure that matches the destination address of the network packet, wherein the longest network identifier entry is indicative of one of the next computing device locations in the computing network; and means for forwarding the network packet to the one of the next computing device locations based on the longest network identifier entry of the default range table, wherein the size of the portion of the destination address defined by the predetermined value configured in the lookup table is automatically updated based on a size of the default range table.

17. The system of claim 16, wherein the routing lookup structure comprises the lookup table and a range table containing a plurality of network identifier entries, the system further comprising:

means for determining that the plurality of network identifier entries of a range table of the routing lookup structure exceeds a threshold number of network identifier entries; and means for in response to determining that the plurality of network identifier entries of the range table of the routing lookup structure exceeds the threshold number of network identifier entries, modifying the predetermined value configured in the lookup table to increase the size of the portion of the destination address.

18. The system of claim 16, wherein the network packet is a first network packet, the destination computing device is a first destination computing device, and the one of the next computing device locations is a first one of the next computing device locations, the system further comprising:

means for receiving a second network packet containing a second destination address defining a location of a second destination computing device;

means for comparing a portion of the second destination address against the plurality of network identifier entries of the lookup table of the routing lookup structure;

means for determining that the portion of the second destination address matches a network identifier entry of the plurality of network identifier entries of the lookup table;

means for in response to determining that the portion of the second destination address matches the entry of the plurality of network identifier entries of the lookup table, comparing the second destination address to a plurality of network identifier entries of a range table;

means for determining that the destination address does not match any network identifier entry of the plurality of network identifier entries of the range table; and means for in response to determining that the destination address does not match any network identifier entry of the plurality of network identifier entries of the range table, determining a longest network identifier entry of the default range table of the routing lookup structure that matches the destination address of the second network packet, wherein the longest network identifier entry is indicative of a second one of the next computing device locations in the computing network; and means for forwarding the network packet to the second one of the next computing devices based on the longest network identifier entry of the default range table.

19. The system of claim 16, wherein the default range table of the routing lookup structure is a secondary lookup table and the portion is a first portion, and a size of a second portion of the destination address is defined by a predetermined value configured in the secondary lookup table, the system further comprising:

means for comparing the second portion of the destination address against a second plurality of network identifier entries of the secondary lookup table;

means for determining that the second portion of the destination address does not match any network identifier entry of the second plurality of network identifier entries of the secondary lookup table indicating that the second portion of the destination address is not contained in the secondary lookup table; and means for in response to determining that the second portion of the destination address does not match any network identifier entry of the second plurality of network identifier entries of the secondary lookup table, determining a longest network identifier entry of a secondary default range table of the routing lookup structure that matches the destination address of the network packet, wherein the longest network identifier entry is indicative of one of the next computing device locations in the computing network; and means for forwarding the network packet to the one of the next computing device locations based on the longest network identifier entry of the secondary default range table;

wherein a size of the second portion of the destination address is less than a size of the first portion of the destination address.

20. The system of claim 16, wherein the plurality of network identifiers is a first plurality of network identifiers and the routing lookup structure comprises the lookup table and a range table containing a second plurality of network identifier entries, the system further comprising:

means for determining that the second plurality of network identifier entries of the range table exceeds a threshold number of network identifier entries;
means for in response to determining that the second plurality of network identifier entries exceeds the threshold number of network identifier entries:
  modifying the predetermined value configured in the lookup table to increase the size of the portion of the destination address; and
configuring the default range table as a secondary lookup table.

* * * * *